United States Patent Office 3,078,209
Patented Feb. 19, 1963

3,078,209
SOIL FUNGICIDE
Joe R. Willard, Middleport, N.Y., and Eldon G. Maitlen, Jackson, Miss., assignors to FMC Corporation, a corporation of Delaware
No Drawing. Filed Oct. 31, 1960, Ser. No. 65,948
4 Claims. (Cl. 167—22)

This invention relates to a new soil fungicide, and to a novel method of protecting seeds and seedlings from attack by the various pathogenic organisms which inhabit soil.

Many types of compounds have been employed to protect plants from the action of pathogenic organisms and, although heretofore fungicides have been developed for application to soil for the benefit of seeds and seedlings, no completely effective soil fungicide has been provided. For example, the compound chloropicrin has been reported to be an effective soil fungicide (as well as a useful insecticide and nematocide); this compound, however, has been denied wide acceptance and use because of its lachrymatory properties, its very high mammalian toxicity and its short residual life.

We have now discovered that 1-chloro-2-nitropropane is an extremely effective and useful soil fungicide, having not only excellent fungicidal activity but also a very low order of mammalian toxicity and excellent residual activity. This compound has been known to have insecticidal properties but, prior to our discovery as described herein, it was not known that this compound possesses outstanding soil fungicidal properties.

Although the compound of this invention, when formulated and applied as a soil fungicide, gives excellent control of soil fungi, it is of interest to note that this compound exhibits no activity of merit when applied as a foliage fungicide.

1-chloro-2-nitropropane forms effective soil fungicidal compositions when formulated with any of the relatively inert adjuvants and carriers normally employed for facilitating the dispersion of active ingredients in agricultural applications, recognizing the accepted fact that the formulation and mode of application of a toxicant may affect the activity of the material in a given application.

For application to soil, active ingredients are most commonly formulated as dusts, as wettable powders, as emulsifiable concentrates, and as solutions, depending on the desired mode of application.

Dusts are admixtures of the active ingredient with finely divided solids such as talc, attapulgite clay, kieselguhr, pyrophyllite, chalk, diatomaceous earths, calcium phosphates, calcium and magnesium carbonate, sulfur, lime, flours and other minerals or organic solids which act as dispersants and carriers for the toxicant. These finely divided solids have an average particle size less than about 50 microns. Since the instant toxicant is a liquid, normally a concentration of about 10% by weight of active ingredient is the maximum concentration which a nonabsorbent dust can accommodate. A typical dust formulation useful herein contains, for example, 10.0 parts of 1-chloro-2-nitropropane, 30.0 parts of bentonite clay and 60.0 parts talc.

Wettable powders, also useful formulations for soil fungicides, are finely divided particles which disperse readily in water or other dispersant. The wettable powder is ultimately applied to the soil either as a dry dust or as an emulsion in water or other liquid. Typical carriers for wettable powders include fuller's earth, kaolin clays, silicas and other highly absorbent, readily wet inorganic diluents. Wettable powders normally are prepared to contain about 5–50% of a liquid active ingredient, depending on the absorbency of the carrier, and usually also contain a small amount of a wetting, dispersing or emulsifying agent to facilitate dispersion. For example, a useful wettable powder formulation contains 25.0 parts of 1-chloro-2-nitropropane, 72.0 parts of bentonite clay and 1.5 parts each of sodium lignosulfonate and sodium laurylsulfonate as wetting agents.

Other useful formulations for soil fungicidal application are the emulsifiable concentrates, which are homogeneous liquid or paste compositions which are readily dispersed in water or other dispersant, and may consist entirely of the liquid 1-chloro-2-nitropropane with an emulsifying agent, and may also contain a liquid carrier for emulsifiable concentrates, such as xylene, heavy aromatic naphthas, isophorone and other non-volatile organic solvents. These concentrates are dispersed in water or other liquid carrier, and normaly applied as a spray to the area to be treated.

Typical wetting, dispersing or emulsifying agents used in agricultural formulations include, for example, the alkyl and alkylaryl sulfonates and sulfates and their sodium salts; alkylamide sulfonates, including fatty methyl taurides; alkylaryl polyether alcohols; sulfated higher alcohols; polyvinyl alcohols; polyethylene oxides; sulfonated animal and vegetable oils; sulfonated petroleum oils; fatty acid esters of polyhydric alcohols and the ethylene oxide addition products of such esters; and the addition products of long chain mercaptans and ethylene oxide. Many other types of useful surface active agents are available in commerce.

Other useful formulations include simple solutions of the active ingredient in a dispersant such as water or an organic solvent in which it is completely soluble at the desired concentration; granular formulations, wherein the toxicant is carried on relatively coarse particles, of particular utility for aerial distribution or for penetration of cover crop canopy; and pressurized sprays, typically aerosols, wherein the active ingredient is dispersed in finely divided form as a result of vaporization of a low boiling dispersant solvent carrier such as the Freons.

The active fungicidal 1-chloro-2-nitropropane of this invention may be prepared by known methods, such as by the reaction of 2-nitro-1-propanol with a chlorinating agent such as sulfuryl chloride or thionyl chloride in the presence of a pyridine base, following the procedure described in U.S. Patent No. 2,397,358, or by the vapor phase reaction of chlorine and nitrogen dioxide with propene as described in U.S. Patent No. 2,874,195. Still other methods have been described in the literature. The following example illustrates one of the methods known to be useful for the preparation of 1-chloro-2-nitropropane:

*Example I*

Substantially anhydrous chlorine was bubbled through 750 grams of substantially anhydrous 2-nitropropane for approximately 44 hours at 55° C. in a glass tube exposed to three 275-watt lights. During this period, 318 grams of chlorine was consumed. The reaction mixture was fractionally distilled to recover unreacted 2-nitropropane and 1-chloro-2-nitropropane, which boiled at 78°–80° C. at 25 millimeters pressure. The yield of 1-chloro-2-nitropropane was 306 grams.

The formulation and application of the soil fungicide of this invention is illustrated in the following examples, wherein all parts and percentages are by weight:

Example II

A 5% dust formulation was prepared by thoroughly mixing 5 parts of 1-chloro-2-nitropropane with 95 parts of kaolin clay. This dust was then blended with soil to give a concentration of 50 p.p.m. of active ingredient. The soil was a non-sterile soil which, in addition to its content of naturally occurring pathogenic organisms, had been inoculated with pure cultures of the following organisms: *Pythium debaryanum*, *Pythium ultimum*, *Rhyzoctania solani*, and *Fursarium oxysporum*, *F. lycopersici*. These mixtures of soil and chemical were placed in metal trays to a depth of approximately two inches, and into the treated soil were planted 100 seeds each of cucumber (*Cucumis sativus* L.), cabbage (*Brassica oleracea* var. *capitata*), tomatoes (*Lycopersicum esculentum* Mill.), soybeans (*Glycine max*), and lima beans (*Phaseolus limensis* Macfad.). Five to eleven days after the planting, depending on variations in germination rate and the growth characteristics of the individual plant species, observations were made of the stand of plants. Only those plants which were healthy and capable of future thrifty growth were counted. Results are tabulated below:

| Crop Seed | Percent Healthy Plants | |
|---|---|---|
| | Treated Soil | Untreated Soil |
| Cucumber | 95 | 5 |
| Cabbage | 82 | 17 |
| Tomato | 78 | 48 |
| Soybean | 95 | 5 |
| Lima Bean | 100 | 47 |

Example III

An emulsifiable concentrate was prepared as follows: 46.9 parts of 1-chloro-2-nitropropane was mixed thoroughly with 48.1 parts xylene and 5.0 parts sodium lignosulfonate. One part by volume of this concentrate was diluted with 39 parts by volume of water and applied at a rate of one pound of active ingredient per acre to soil in Western New York which was known to contain Rhyzoctonia, Fusarium and Pythium organisms. In rows were then planted seeds of each of the following crops: cucumber (*Cucumis sativus* L.), broccoli (*Brassica oleracea* var. *botrytis*), sugar beet (*Beta vulgaris* var. *saccharifera*), onion (*Allium cepa* L.), tomato (*Lycopersicum esculentum* Mill.) and lima bean (*Phaseolus limensis* Macfad.). Nine to thirty-nine days after the planting observations were made of the stand of plants, whenever the crop had reached a constant total number of germinated plants. Only those plants which were heathy and capable of future thrifty growth were counted as healthy plants. These results were compared with a control in untreated soil (water only). Results are tabulated below:

| Crop Seed | Percent Healthy Plants | |
|---|---|---|
| | Treated Soil | Untreated Soil |
| Cucumber | 91 | 22 |
| Broccoli | 68 | 22 |
| Lima bean | 85 | 29 |
| Sugar beet | 61 | 22 |
| Onion | 48 | 26 |
| Tomato | 33 | 11 |

It is seen that roughly three times as many healthy plants grew in the soil treated with the 1-chloro-2-nitropropane composition as in the untreated soil, under actual field conditions.

Because of their long residual life in the soil, the soil fungicide of this invention may be applied to the soil several days before planting. It is generally preferred, however, to apply the soil fungicide at the time of planting in order to obtain maximum protection for the seedling and young plant as well as during germination. The soil fungicidal compositions of this invention may be formulated and/or applied with insecticides, nematocides, plant growth regulators, fertilizers, and other agricultural chemicals.

In applying the soil fungicide of this invention, whether formulated alone or with other agricultural chemicals, a fungicidal amount and concentration of the toxicant 1-chloro-2-nitropropane should of course by employed.

It is apparent that various modifications may be made in the formulation and application of the soil fungicide of this invention, without departing from the novel concept herein, as defined in the following claims.

We claim:

1. Soil fungicidal composition comprising 1-chloro-2-nitropropane in admixture with an organic solvent and a wetting agent.

2. Soil fungicidal composition comprising a minor proportion of 1-chloro-2-nitropropane and a major proportion of a finely divided solid having an average particle size less than about 50 microns.

3. Soil fungicidal composition comprising 1-chloro-2-nitropropane, an inert adjuvant therefor and a wetting agent.

4. The method of combatting fungi in the soil which comprises applying a fungicidal amount and concentration of 1-chloro-2-nitropropane to the soil.

References Cited in the file of this patent

UNITED STATES PATENTS

| | | |
|---|---|---|
| 2,281,239 | Hass | Apr. 28, 1942 |
| 2,397,358 | Lingo | Mar. 26, 1946 |
| 2,502,244 | Carter | Mar. 28, 1950 |
| 2,874,195 | Bachman | Feb. 17, 1959 |
| 2,987,479 | Bennett | June 6, 1961 |

OTHER REFERENCES

King: U.S. Dept. Agr. Handbook No. 69, 1954, page 278.